(12) United States Patent
Lee et al.

(10) Patent No.: US 7,386,729 B2
(45) Date of Patent: Jun. 10, 2008

(54) METHOD OF INSERTING/DETECTING DIGITAL WATERMARK AND APPARATUS FOR USING THEREOF

(75) Inventors: Jung-Soo Lee, Seoul (KR); Jong-Uk Choi, Seoul (KR); Han-Ho Lee, Seoul (KR)

(73) Assignee: Markany, Inc., Seoul (KR)

( * ) Notice: Subject to any disclaimer, the term of this patent is extended or adjusted under 35 U.S.C. 154(b) by 874 days.

(21) Appl. No.: 10/312,029

(22) PCT Filed: Apr. 22, 2002

(86) PCT No.: PCT/KR02/00740

§ 371 (c)(1),
(2), (4) Date: Aug. 19, 2003

(87) PCT Pub. No.: WO02/093930

PCT Pub. Date: Nov. 21, 2002

(65) Prior Publication Data

US 2004/0030899 A1    Feb. 12, 2004

(30) Foreign Application Priority Data

Apr. 21, 2001  (KR) ............................... 2001-21586

(51) Int. Cl.
*G06F 17/14* (2006.01)
*G06K 9/36* (2006.01)
*H04K 1/00* (2006.01)

(52) U.S. Cl. ............... 713/176; 708/400; 382/250; 382/280

(58) Field of Classification Search ............ None
See application file for complete search history.

(56) References Cited

U.S. PATENT DOCUMENTS

| | | | | |
|---|---|---|---|---|
| 5,768,426 A | * | 6/1998 | Rhoads | 382/232 |
| 5,905,800 A | * | 5/1999 | Moskowitz et al. | 380/28 |
| 6,209,094 B1 | * | 3/2001 | Levine et al. | 713/176 |
| 6,219,634 B1 | * | 4/2001 | Levine | 704/200.1 |
| 6,320,965 B1 | * | 11/2001 | Levine | 380/34 |
| 6,330,673 B1 | * | 12/2001 | Levine | 713/176 |
| 6,345,100 B1 | * | 2/2002 | Levine | 380/205 |
| 6,823,455 B1 | * | 11/2004 | Macy et al. | 713/176 |

FOREIGN PATENT DOCUMENTS

| | | |
|---|---|---|
| EP | 0 962 886 A2 | 12/1999 |
| EP | 0 967 803 A2 | 12/1999 |
| EP | 0 962 886 A3 | 8/2001 |
| EP | 0 967 803 A3 | 10/2001 |

OTHER PUBLICATIONS

Djurovic, I., Stankovic, S., Pitas, I., Stankovic, LJ., and Tilp, J., "*Generalization of the Fourier Domain Watermarking to the Space/Spatial-Frequency Domain*", First Int'l Workshop on Image and Signal Processing and Analysis, Jun. 14-15, 2000, pp. 47-51, Pula, Croatia.

* cited by examiner

*Primary Examiner*—Christopher Revak
(74) *Attorney, Agent, or Firm*—Senniger Powers LLP

(57) ABSTRACT

For the purpose of designing watermark to be robust against image modification such as geometric modification (rotating, cutting, enlarging/shrinking, etc.), compression, and blurring, the watermark is embedded in frequency domain after formed as 2 dimensional shape, for example radial or concentric shape. In detecting watermark, it is possible to effectively detect the watermark, by using relation to a generated watermark in case where the peak is detected.

35 Claims, 14 Drawing Sheets

(A) ONE-DIMENSIONAL WATERMARK GENERATION (B) RESIZE TO VARIOUS LENGTHS (C) TWO-DIMENSIONAL CIRCULAR ARRANGEMENT

Fig. 9A

| 0 | -1 | 0 |
|---|----|---|
| -1 | 5 | -1 |
| 0 | -1 | 0 |

| -1 | -1 | -1 |
|----|----|----|
| -1 | 9 | -1 |
| -1 | -1 | -1 |

| 1 | -2 | 1 |
|---|----|---|
| -2 | 5 | -2 |
| 1 | -2 | 1 |

HIGH BOOST MASK

Fig. 9B

| -1 | -1 | -1 |
|----|----|----|
| -1 | 8 | -1 |
| -1 | -1 | -1 |

| 0 | -1 | 0 |
|---|----|---|
| -1 | 4 | -1 |
| 0 | -1 | 0 |

LAPLACIAN MASK

Fig. 9C

| 0 | 0 | -1 | -1 | -1 | 0 | 0 |
|---|---|---|---|---|---|---|
| 0 | -2 | -3 | -3 | -3 | -2 | 0 |
| -1 | -3 | 5 | 5 | 5 | -3 | -1 |
| -1 | -3 | 5 | 16 | 5 | -3 | -1 |
| -1 | -3 | 5 | 5 | 5 | -3 | -1 |
| 0 | -2 | -3 | -3 | -3 | -2 | 0 |
| 0 | 0 | -1 | -1 | -1 | 0 | 0 |

| 0 | 0 | 0 | -1 | -1 | -1 | 0 | 0 | 0 |
|---|---|---|---|---|---|---|---|---|
| 0 | -2 | -3 | -3 | -3 | -3 | -3 | -2 | 0 |
| 0 | -3 | -2 | -1 | -1 | -1 | -2 | -3 | 0 |
| -1 | -3 | -1 | 9 | 9 | 9 | -1 | -3 | -1 |
| -1 | -3 | -1 | 9 | 19 | 9 | -1 | -3 | -1 |
| -1 | -3 | -1 | 9 | 9 | 9 | -1 | -3 | -1 |
| 0 | -3 | -2 | -1 | -1 | -1 | -2 | -3 | 0 |
| 0 | -2 | -3 | -3 | -3 | -3 | -3 | -2 | 0 |
| 0 | 0 | 0 | -1 | -1 | -1 | 0 | 0 | 0 |

DoG MASK

Fig. 10

| 0 | 0 | 0 | −1 | 0 | 0 | 0 |
|---|---|---|----|---|---|---|
| 0 | 0 | 0 | −1 | 0 | 0 | 0 |
| 0 | 0 | 0 | −1 | 0 | 0 | 0 |
| −1 | −1 | −1 | 13 | −1 | −1 | −1 |
| 0 | 0 | 0 | −1 | 0 | 0 | 0 |
| 0 | 0 | 0 | −1 | 0 | 0 | 0 |
| 0 | 0 | 0 | −1 | 0 | 0 | 0 |

METHOD OF INSERTING/DETECTING DIGITAL WATERMARK AND APPARATUS FOR USING THEREOF

TECHNICAL FIELD

The present invention relates to a method for embedding and detecting a digital watermark in and from digital multimedia contents and an apparatus using the same. More particularly, the present invention relates to a digital watermark embedding and detection method and an embedding and detection apparatus using the same for producing a spatially configured watermark, embedding and recording the configured watermark in an image in a frequency domain, and detecting the watermark effectively from the watermark-embedded image.

BACKGROUND ART

Recently, together with the wide spreading of the internet and computers and the rapid distributions of multimedia data, illegal copies (piracy) and distributions are widely prevalent so that an effective protection apparatus for a copyright to multimedia data gets required. Watermarking technology is one that embeds user information (watermark), unrecognizable by a user, in multimedia data, to thereby prevent pirated copies and protect a copyright of a copyright owner.

The watermark means a mark developed in a step using a frame for pressing wet fibrous material to get rid of water in a process making paper from papyrus in ancient times. Marks embedded in paper in order for paper manufacturers in the middle ages to prove their own goods are the watermarks in the middle ages, and, nowadays, an image is embedded which can be recognized only with light when, in a process of making banknotes, printing on both sides of a sheet of paper after drying the wet sheet on which printing has been done, and the image is referred to as a watermark.

In these days, together with the increase of digital media, the concept of a digital watermark has appeared. Just as paper in an analog concept is substituted with the concept of digital paper, digitalizing all the analog media in which the past watermarks were embedded has brought into the concept of the digital watermark as a mark hidden in digital images, audio, video, and so on. That is, the watermarking refers to all technical methods hiding and extracting a special form of watermark in multimedia contents in order to protect a series of multimedia contents. At the beginning, researches have been carried out for methods hiding original multimedia contents themselves, but, at present, it is a trend that strong watermarking technologies using lots of technical transform methods are developing.

The watermarking is classified into a visible watermarking and an invisible watermarking based on the visibility of a watermark, and the invisible watermarking is again classified into a spatial domain watermarking and a frequency domain watermarking based on the methods embedding a watermark.

The visible watermarking specifies a copyright by embedding in an original image author information which can be recognized with eyes. The visible watermarking can be used with ease but has a drawback in that the originals are damaged.

Accordingly, the invisible watermarking is primarily used in the image watermarking technology in these days. The invisible watermarking is a technology embedding a watermark not to be visually perceived by using a limit of senses of the human visual system. While the spatial domain watermarking embeds and extracts a watermark with ease, there is a high possibility to lose a watermark by means of signal processing, video processing (non-linear filtering, rotating, cutting, moving, enlarging, and reducing transforms and the like), and compressing.

However, the frequency domain watermarking employs transform techniques such as Fourier transform, discrete cosine transform, or the like for embedding and extraction, so there exists a drawback in that it has a complicated algorithm and requires lots of arithmetic operations, but it has an advantage in that it is robust on general attacks such as filtering or compressions.

The invisible embedding of a watermark requires an embedding of the same in a low value on a broad area, which is carried out by the spread spectrum technology of Ingemar J. Cox. In the spread spectrum technology, a pseudo-random sequence is used as a watermark, which is a method that can be effectively used since the sequence has a uniform distribution function and is evenly distributed over the entire bandwidth of frequencies.

For methods transforming an original image into a frequency domain, the fast Fourier transform (FFT), discrete cosine transform (DCT), and wavelet transform are generally utilized a lot, which takes a method embedding and restoring a watermark into the original state in a transform plane. However, the method has a high possibility to lose a watermark on attacks such as image rotating, cutting, moving, enlarging, reducing, or the like.

As stated above, the watermarking methods in the spatial domain or frequency domain have advantages and disadvantages in their own ways. For an alternative, a watermarking method using the log-polar mapping and Fourier transform has been developed to compensate for the loss of a watermark, which is the weak point of the frequency domain watermarking method, in rotating, enlarging, or reducing an image. The method converts rotations, enlargements, and reductions into a simple movement forms through the log-polar mapping and detects a watermark by using the characteristics that the amplitudes of the Fourier transform are invariable with movements. However, the method is weak at the video processing such as compressions as well as has a big drawback in that the loss due to the log-polar mapping itself is very high and the implementations become very complicated.

As mentioned above, the developed watermarking technologies for video have advantages and disadvantages in general in their own ways. Further, the pseudo-random sequence watermark being widely used at present can confirm what key value a watermark embedded in an image has, but has difficulties in embedding and extracting various copyright information.

Further, in case of firstly casting and then embedding a watermark in an input image, an embedded watermark is changed if the image undergoes rotations, partial cuttings, or the like, causing a problem impairing copyright information.

DETAILED DESCRIPTION OF THE INVENTION

It is an object of the present invention to provide a digital watermark embedding and detection method and a apparatus using the same which are robust against image variations such as rotation, enlargement/reduction, cutting, and filtering.

It is another object of the present invention to provide a digital watermark embedding and detection method and a apparatus using the same which spatially configure a watermark, convert an image signal into a frequency domain, and embed the spatially configured watermark to thereby be robust against image variations.

It is yet another object of the present invention to provide a watermark detection method and a apparatus using the same which effectively detect a spatially configured digital watermark embedded in an image signal in a frequency domain.

In order to achieve the above objects, a method for embedding a digital watermark in an image signal according to the present invention comprises steps of:

using a user key and an inherent key and generating respective pseudo-noise codes thereof;

adding the pseudo-noise code generated based on the user key and the pseudo-noise code generated based on the inherent key;

generating a digital watermark including a step of arranging in a two-dimensional form a watermark formed by the addition;

converting an image signal from a spatial domain to a frequency domain; and adding a magnitude component of the image signal converted into the frequency domain and a watermark generated by the watermark generation step.

Further, a method for detecting a digital watermark according to the present invention comprises steps of:

strengthening a component of the digital watermark embedded in the image signal;

converting the digital watermark-strengthened image signal from a spatial domain to a frequency domain and extracting the digital watermark included in the image signal;

generating a digital watermark for comparison with the extracted digital watermark;

calculating correlation between the generated digital watermark and the digital watermark extracted from the image signal; and detecting the watermark embedded in the image signal based on the correlation.

As stated above, unlike a method simply embedding a watermark of a certain form in an existing spatial domain or frequency domain, the present invention can embed a watermark not linearly but spatially configured in a frequency domain so that the watermark is not changed due to external variations such as image rotation, cutting, or the like. In particular, the watermark embedded according to the present invention is arranged in a radial form or in a form of plural concentric circles about the center of a block structuring an image signal from a watermark of a stream form.

Furthermore, the digital image watermarking apparatus and method according to the present invention employ a sharpness degree, a maximum value, and its position in use of the fourth moment (Kurtosis) in the correlation of a user key value and a watermark, featuring maximizing the accuracies of the watermark detections and authentications.

BRIEF DESCRIPTION OF THE DRAWINGS

The above objects and other features of the present invention will become more apparent by describing in detail a preferred embodiment thereof with reference to the attached drawings, in which:

FIG. 9 is an exemplary view for showing filters serving watermark detections, wherein FIG. 9A shows a high boost filter, FIG. 9B shows a Laplacian filter, and FIG. 9C shows a DoG (Difference of Gaussian) filter having 7×7 and 9×9 masks;

FIG. 10 is a view for showing an example of a mask form employed for an effective watermark detection;

FIG. 11 is an exemplary view for showing processed results by filters of FIG. 9, wherein

EMBODIMENT

Hereinafter, the watermark embedding and detection method and the watermark embedding and detection apparatus using the same according to the present invention are described in detail with reference to the accompanying drawings.

Figure 1:
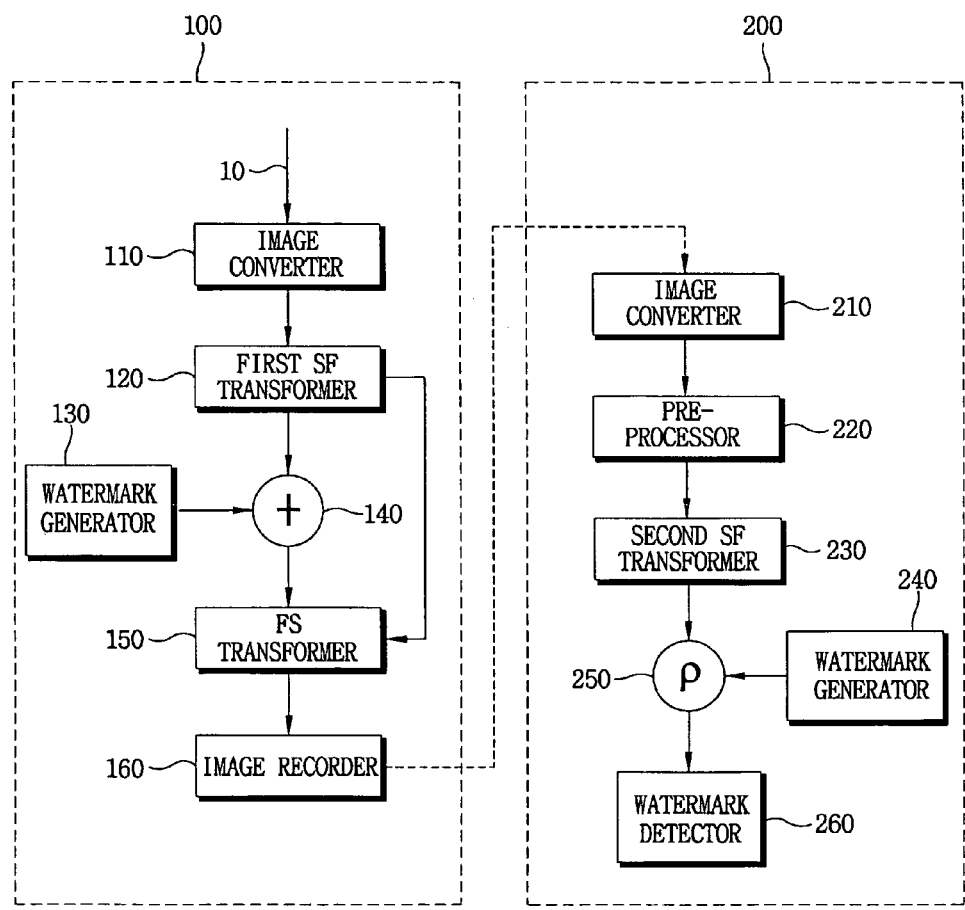
FIG. 1 is a block diagram for schematically showing a structure of a digital watermark embedding and detection apparatus according to an embodiment of the present invention.
Figure 2:
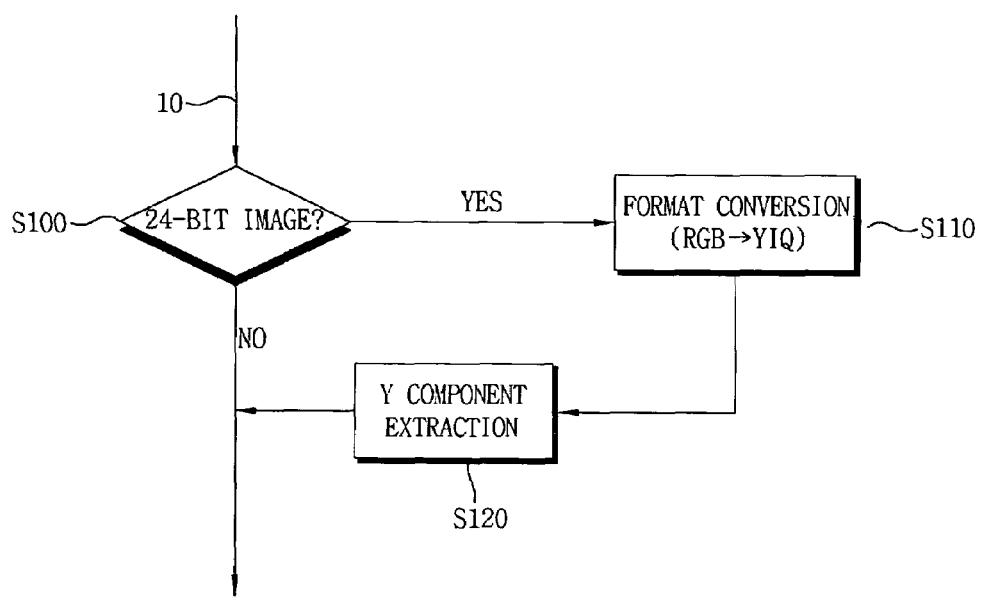
FIG. 2 is a flow chart for schematically showing operations of an image converter of a watermark embedding apparatus in FIG. 1.
Figure 3:
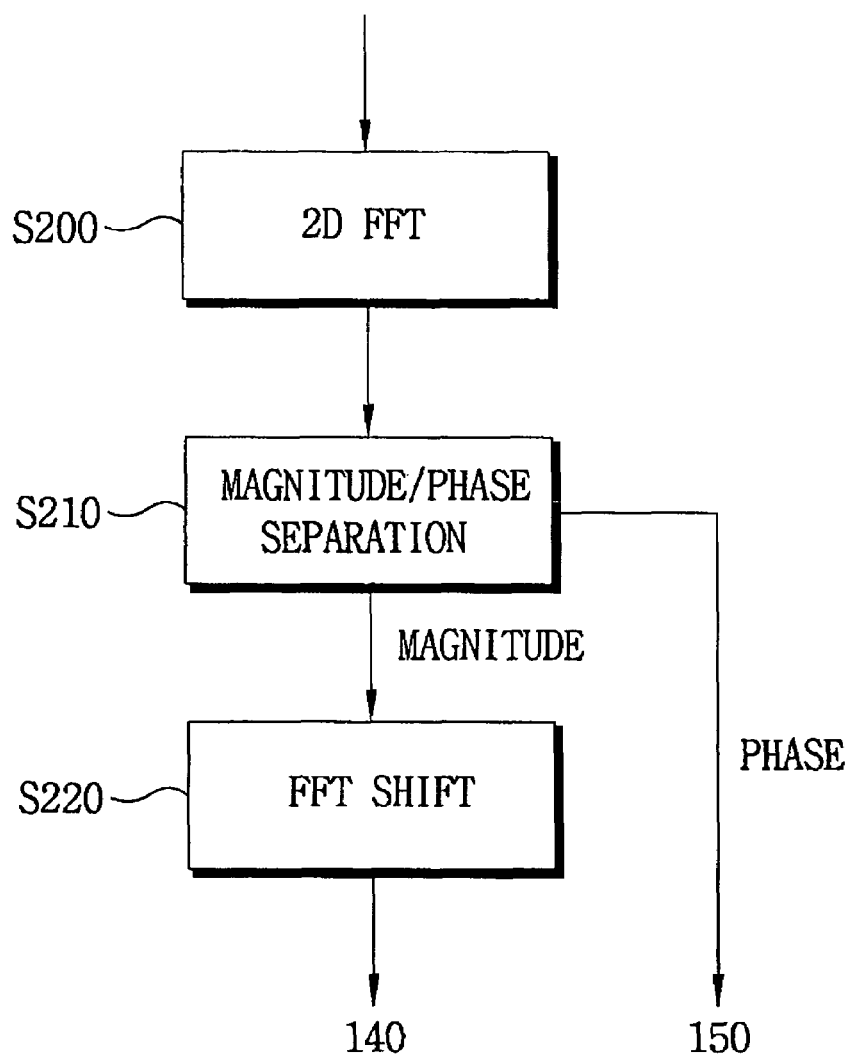
FIG. 3 is a flow chart for schematically showing operations of a first SF transformer of a watermark embedding apparatus in FIG. 1.

FIG. 1 is a block diagram for schematically showing a structure of a digital watermark embedding and detection apparatus according to an embodiment of the present invention.

The digital watermark embedding and detection apparatus in FIG. 1 comprises a watermark embedding apparatus 100 for embedding a watermark into an inputted image and a watermark detection apparatus 200 for detecting a watermark from a watermark-embedded image. The watermark embedding apparatus 100 includes an image converter 110 converting an inputted image 10 into a certain form based on characteristics thereof, a first Spatial-to-Frequency (FS) transformer 120 transforming an output signal of the image converter 110 from a spatial domain to a frequency domain in consideration of an image form, a watermark generator 130 generating a watermark spatially arranged, an adder 140 adding the watermark generated from the watermark generator 130 and an image signal outputted from the first SF transformer 120, a Frequency-to-Spatial (FS) transformer 150 transforming the watermark-added signal from the frequency domain to the spatial domain again, and an image recorder 160 recording the watermark-embedded image signal.

Further, the watermark detection apparatus 200 includes an image converter 210 receiving a reproduced image signal and converting it into a certain form of format, a preprocessor 220 strengthening the characteristics of a watermark included in an output signal of the image converter 210, a second SF transformer 230 transforming the watermark characteristics-strengthened image signal from the spatial domain to the frequency domain and extracting a watermark region from the corresponding image signal, a watermark generator 240 generating a watermark spatially arranged, a correlation calculator 250 calculating a correlation between a watermark extracted from the second SF transformer 230 and a watermark outputted from the watermark generator 240, and a watermark detector 260 detecting a watermark included in an image signal based on an output value from the correlation calculator 250.

The operations in the watermark embedding and detection apparatus having the above structure are described with respective constituents thereof. First, the operations of the watermark embedding apparatus 100 are described with reference to FIG. 2 to FIG. 8.

An image 10 is inputted to the image converter 110 to embed a watermark in a digital image signal. Describing the operation flow of the image converter 110 with reference to FIG. 2, the image converter 110 checks whether the inputted image 10 is a 24-bit color image (Step S100). At this time, it is determined by checking the header information of the inputted image signal whether the inputted signal is in 24-bit. If the inputted image 10 is in the 24-bit color, the RGB components of the inputted image are converted into a YIQ format by employing Formula 1 as below (Step S110), wherein Y stands for Luminance, I for In-phase, and Q for Quadrature.

[Formula 1]

$$\begin{bmatrix} Y \\ I \\ Q \end{bmatrix} = \begin{bmatrix} 0.2989 & 0.587 & 0.114 \\ 0.5959 & -0.2744 & -0.3216 \\ 0.2115 & -0.5229 & 0.3114 \end{bmatrix} \begin{bmatrix} R \\ G \\ B \end{bmatrix}$$

The I and Q components in the converted format are separately stored, and only the Y component is extracted (Step S120). The extracted Y component passes over to the first SF transformer 120.

In the step S100, if the inputted image is not a 24-bit color image, the process directly proceeds with the first SF transformer 120. That is, if the inputted image is not the 24-bit color image, the image 10 actually inputted corresponds to the same signal as the Y component of the 24-bit color case, so the inputted image 10 is directly transferred to the first SF transformer 120 without any conversion process into the YIQ format. Accordingly, if the inputted signal is not the 24-bit, no separate image converter 110 may be provided. Further, in the above case, an input image is processed into the YIQ format based on the NTSC format, and, in other formats, a watermark can be embedded by directly separating an RGB signal into respective R, G, and B channels for outputs without converting a format of the inputted image.

A result processed in the image converter 110 is inputted to the first SF transformer 120. The first SF transformer 120 carries out a transform in order shown in FIG. 3.

The output signal of the image converter 110 is applied with two-dimensional Fast Fourier Transform (Formula 2) (Step S200). A result of the two-dimensional Fast Fourier Transform is expressed as a form of a complex number which is divided into a real number component (R) and an imaginary number component (I). The general Fourier Transform can be employed in lieu of the above Fast Fourier Transform.

[Formula 2]

$$1)\ F(n_1, n_2) = \sum_{k_2=0}^{N_2-1} \sum_{k_1=0}^{N_1-1} \exp\left(\frac{2\pi i k_2 n_2}{N_2}\right) \exp\left(\frac{2\pi i k_1 n_1}{N_1}\right) f(k_1, k_2)$$

$$M = \sqrt{(R^2 + I^2)} \quad\quad 2)$$

$$3)\ \Theta = \arctan\left(\frac{I}{R}\right)$$

In here, f denotes an image signal, F a frequency coefficient obtained after Fourier Transform, M a magnitude of values obtained after a frequency transform, and θ a phase, respectively.

Since a complex number form appears by the Fourier Transform, the frequency coefficient is divided into real number and imaginary number components. A magnitude and a phase are calculated and separated, respectively, by using Formula 2 from these components (Step S210). In the step S210, the image signal is separated into a magnitude and a phase respectively, and the magnitude component is FFT-shifted to be converted into a form for embedding a watermark (Step S220). The FFT shift shifts magnitude components to a center portion in order for a to-be-later-embedded watermark to be embedded about the center. Further, phase components are transferred to the FS transformer 150 in order to transform an image signal into the spatial domain again after embedding a watermark.

Using magnitude components for embedding a watermark is because, when Fourier-Transformed, magnitude components have the characteristics shown in Formula 3.

[Formula 3]

$$f(x+a, y+b) \leftrightarrow M(u, v)e^{-j(au+bv)}$$

$$f(\rho x, \rho y) \leftrightarrow \frac{1}{\rho} M\left(\frac{u}{\rho}, \frac{v}{\rho}\right)$$

$$f(x\cos\theta - y\sin\theta, x\sin\theta + y\cos\theta) \leftrightarrow M(u\cos\theta - v\sin\theta, u\sin\theta + v\cos\theta)$$

Wherein, f denotes an image signal, M a magnitude of values obtained after frequency conversions, ρ a constant multiplied upon resizing (a resizing multiple), and θ a phase, respectively.

As seen in a result of Formula 3, the characteristics are used that a magnitude component is the same even though an image is shifted, and an absolute position does not vary even though a image scale changes. By configuring a watermark into a circular form in addition to the characteristics, the watermark is prevented from damages even in variations of an image by rotations.

The image signal processed by the first SF transformer 120 is added to a watermark generated from the watermark generator 130 and then embedded to the inputted image.

Figure 4:
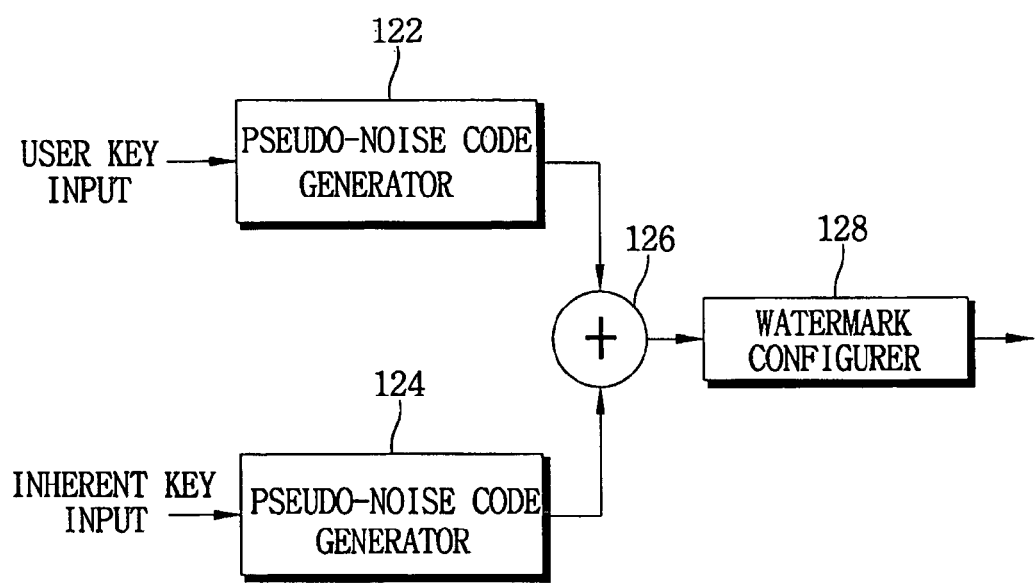
FIG. 4 is a view for schematically showing a structure of a watermark generator of a watermark embedding apparatus in FIG. 1.
Figure 5:
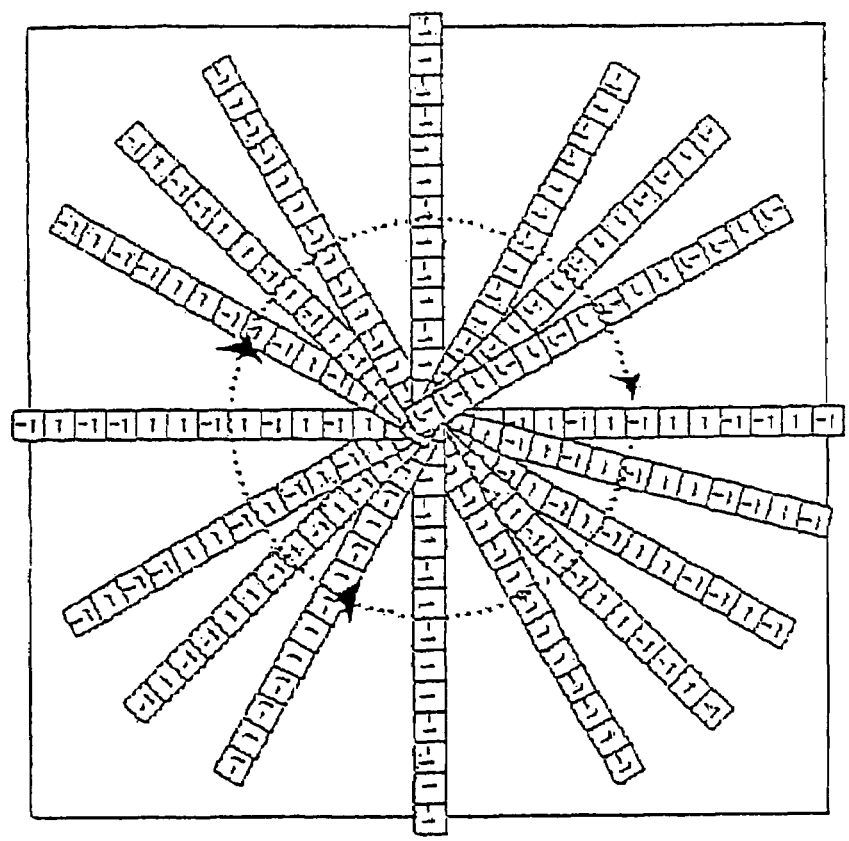
FIG. 5 is a view for showing an example of a two-dimensional watermark implemented by a watermark configurer in FIG. 4.

The watermark generator 130 generates a watermark by a structure shown in FIG. 4. First, a user key is inputted to a pseudo-noise code generator 122, which generates a pseudo-noise code by using the user key as a seed value. In the meantime, an inherent key generated to facilitate a watermark detection, separately from the user key, is inputted into a pseudo-noise code generator 124, and a pseudo-noise code is generated in the same manner as in the user key.

The two pseudo-noise codes so generated are added in an adder 126. An added pseudo-noise code is inputted to a watermark configurer 128. The watermark configurer 128 newly configures a watermark of a one-dimensional stream format into a two-dimensional format. Viewing a format shown in FIG. 5 as an example, a watermark is configured to be arranged in a two-dimensional radial format while rotating 360 degrees about a first value of a watermark of a certain length. In the case of configuring a watermark in the two-dimensional radial format as above, a watermark-embedded image is not affected by external attacks since a watermark format does not changes even though the watermark-embedded image is varied by external attacks such as rotations and so on.

Figure 6A:
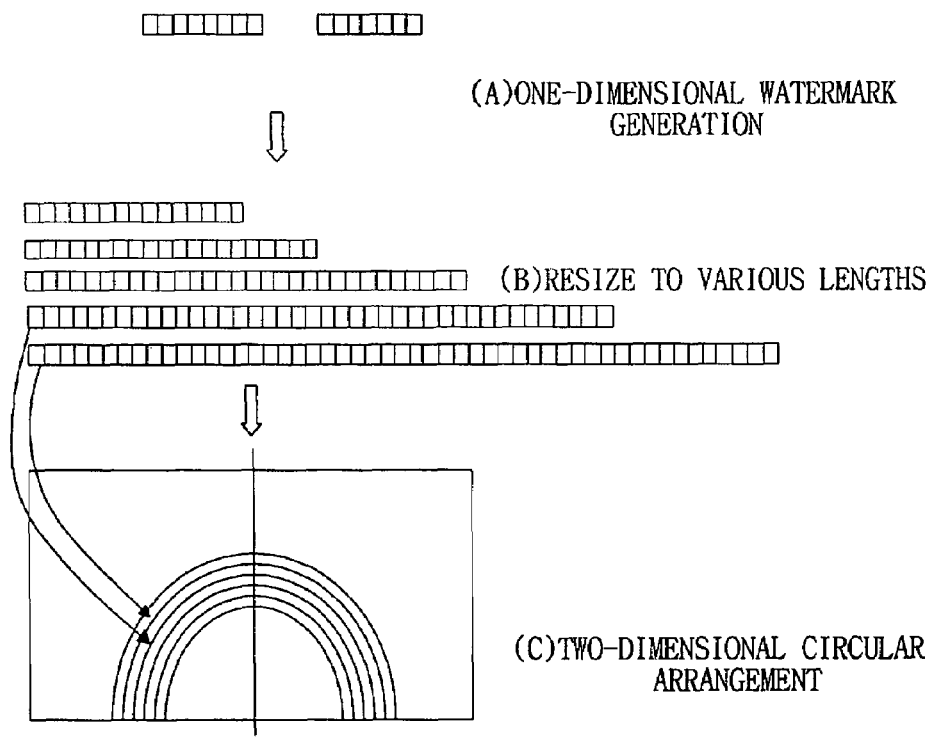
FIG. 6A is a view for showing a process forming another example of a two-dimensional watermark implemented by a watermark configurer in FIG. 4.
Figure 6B:
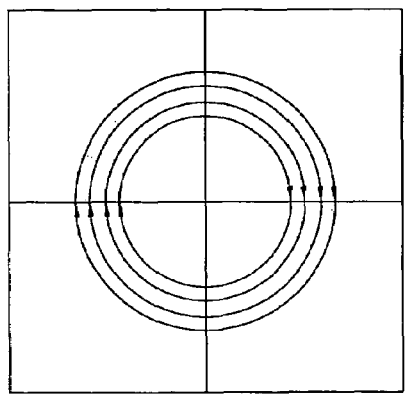
FIG. 6B is a view for showing a watermark formed by FIG. 6A.

Further, another example configuring a watermark in the two-dimensional format is described with reference to FIG. 6. FIG. 6A is a view for showing a process for configuring one watermark sequence into plural concentric circles, and FIG. 6B is a view for showing a watermark in plural concentric circles consequently generated.

As in (a) of FIG. 6A, after configuring a watermark Wseq formed in a sequence of 1 and −1, the watermark Wseq is resized in various lengths as in (b) to configure a watermark as in (c). FIG. 6B shows a watermark implemented by the watermark configurer through the process of FIG. 6A.

As stated above, when a watermark is configured in a circular shape, a watermark is arranged in a concentric format about the center of a block. When arranged in the concentric format, there exists a radial difference between an inner watermark and an outer watermark, so a difference occurs between bit lengths configuring watermarks. Accordingly, watermarks are sampled at a certain rate in accordance with radial magnitudes to be enlarged and reduced for arrangements. When a watermark is arranged in a circular shape, an upper side is configured in a watermark stream and then the stream is copied for a lower side, to be arranged in the same rotation direction for use. An initially formed shape is a semi-circle rather than a concentric circle, which is because an initial component of the Fourier Transform is an origin symmetry, so a watermark is embedded by a semi-circle and then the semi-circle is copied in the origin symmetry, to thereby bring out an effect embedding concentric circles as in FIG. 6b.

The watermark so formed is inputted to the adder 140 to be added to an image signal outputted from the first SF transformer 120.

The adder 40 first divides the image into blocks of a predetermined size, that is, a watermark size in order to add a watermark configured from the watermark generator 130 and the image signal outputted from the first SF transformer 120. The divided image signal and the watermark signal outputted from the watermark generator 130 are added. At this time, the intensity of a watermark embedded according to the characteristics of the image signal is determined beforehand for the addition.

The determination of the watermark intensity can be accomplished in various forms. For example, it is determined by the number of colors used for each channel in a block, histogram shape, energy ratio of high and low frequencies, and so on.

For example, when dividing an image block by block, the number of colors used for each block and a color value are obtained. In case that many color numbers are used and the color value is high, a real image corresponds to one that has severe color changes or colors of a brilliant form. Accordingly, a visual effect is not experienced so much even though the intensity of a watermark to be embedded in a corresponding block is high. However, in case that color changes are small, even a watermark embedded with a low intensity can give a feeling that much noise is included in an original image. Therefore, the number of colors used in a block and a color value are considered to determine the intensity of a watermark to be embedded to be strong when the value is high and to be weak when the value is low.

Further, if the DCT transform is applied to an image to be expressed in a block, it is characterized in that a part corresponding to a low frequency region is clustered in the upper left of the block, a part corresponding to an intermediate frequency region in the center portion, and a part corresponding to a high frequency region in the lower right. That is, the DCT result enables the characteristics of an inputted image to be grasped depending on a ratio of a low frequency energy and a high frequency energy.

Moreover, if an inputted image is analyzed channel by channel, each of R, G, and B channels has 8 bits ($2^8=256$) and values 0~255 are allocated to each color in case of a 24-bit color, and it is available that a histogram is prepared based on the values with respect to image regions and the changes or occupied colors in an image are grasped based on the shape and changes of the histogram. That is, if the number of used colors is small, the distribution of the histogram becomes narrow, and to the contrary, if the number of used colors is large, the distribution of the histogram becomes wide. The large number of used colors means that an image has severe changes, and, to the contrary, the small number of used colors means that an image is dull without particular changes. Accordingly, with this, it can be determined whether an image energy is concentrated in a high frequency region or in a low frequency region.

In a method for adding a watermark, it is also possible to independently embed a watermark directly into each channel, that is, in case of a Gray image, into the Gray channel and, in case of an RGB image, into respective R, G, and B channels, without passing through the image converter 110. If a watermark-embedded signal is outputted, the signal is inputted to the FS transformer 150 and then converted from a frequency domain to a spatial domain.

Figure 7:
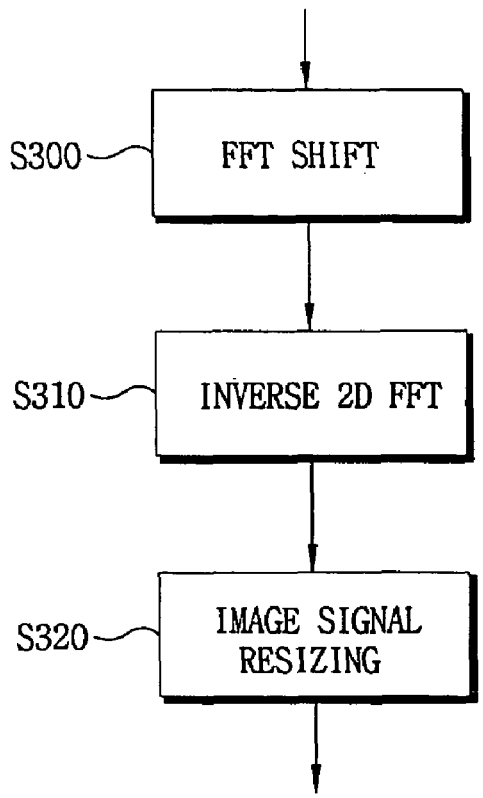
FIG. 7 is a flow chart for schematically showing operations of an FS transformer of a watermark embedding apparatus in FIG. 1.

The operations carried out in the FS transformer 150 is described with reference to FIG. 7.

The FS transformer 150 basically carries out in the reverse order the process done by the first SF transformer 120. That is, an FFT shift is carried out with respect to a watermark-embedded signal (Step S300). This plays a role of shifting the signal into an original format by applying again the FFT shift done for the signal prior to embedding a watermark. After shifting, the signal component (magnitude component) and a phase component separated and extracted before from the first SF transformer 120 are added and then an inverse 2D FFT is applied to transform a frequency domain signal into a spatial domain signal (Step S310).

After the transform, an image signal is resized to prevent an overflow which can occur by an addition with a watermark carried out in the above step (Step S320). For example, an R channel signal of 8 bits has values ranging from 0 to 255, which can have values less than 0 or larger than 255 by the addition with a watermark in the adder 140. A watermark size basically has a value of −1 or 1, or, in case of resizing, has values of integer multiples of the above value, and, even though the size is not big, may have a value out of a range from 0 to 255 by the addition with an image signal. At this time, abrupt color changes are developed. Accordingly, in case that an addition result becomes less than 0 or larger than 255, an overflow occurs and corresponding values are adjusted to 0 or 255, respectively, that are boundary values the signal can have.

Figure 8:
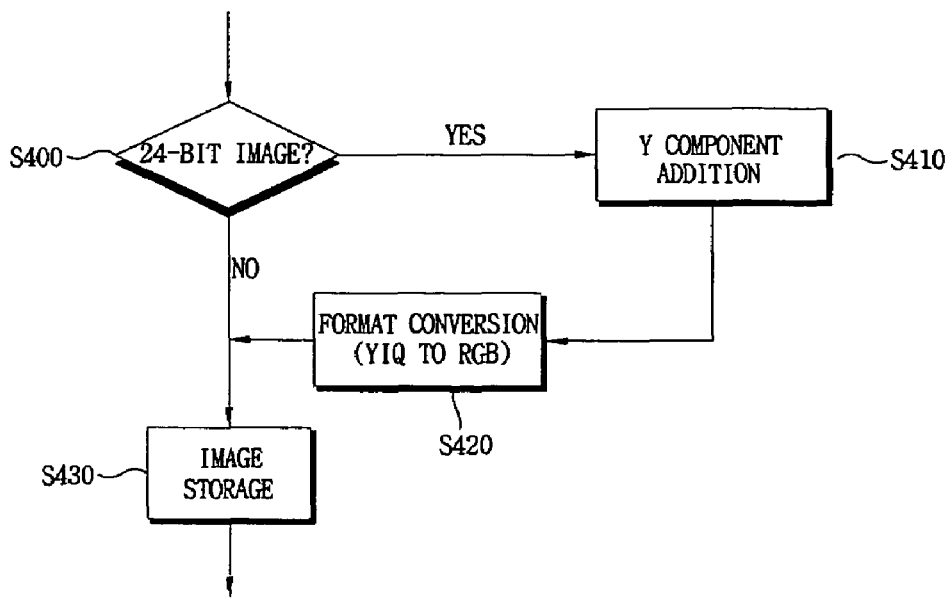
FIG. 8 is a flow chart for showing operations of an image recorder of a watermark embedding apparatus in FIG. 1.
Figure 11A:
FIG. 11A is a view for showing an example of a watermarked image before filtering, and FIGS. 11B to 11D respectively show the processed results by a high boost filter, Laplacian filter, and DoG filter.
Figure 11B:
Figure 11C:
Figure 11D:
Figure 12:
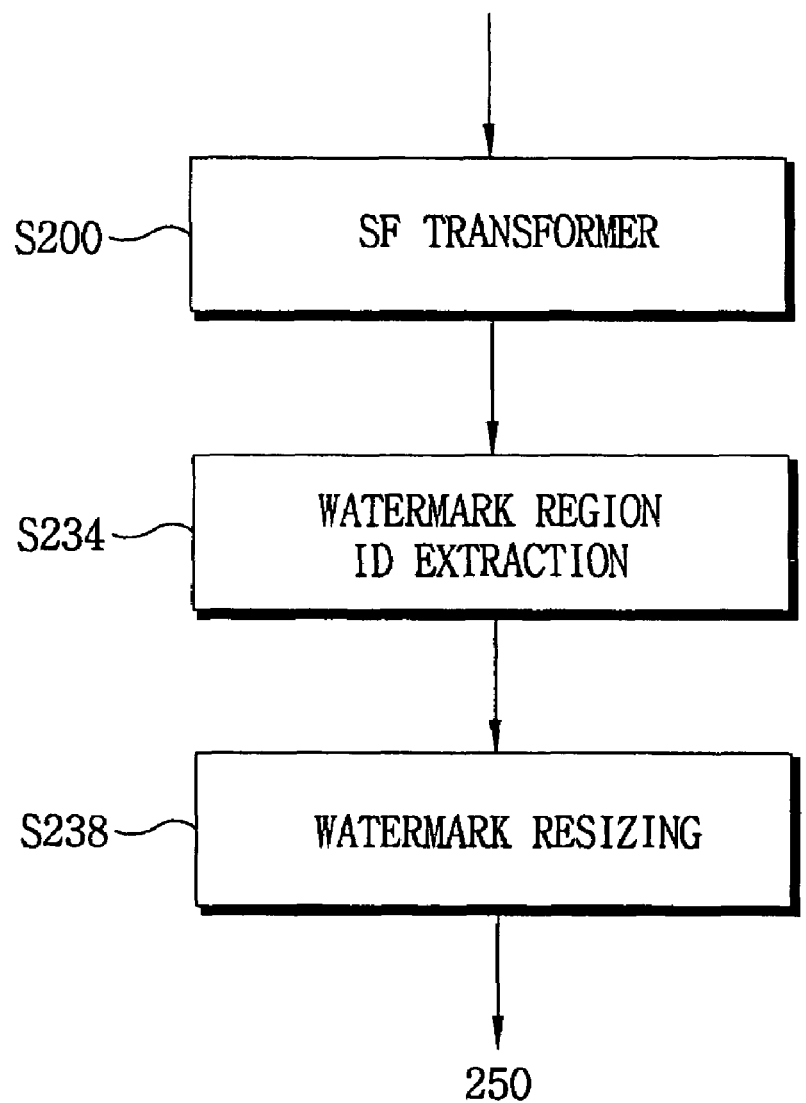
FIG. 12 is a flow chart for showing operations of a second FS transformer of a watermark detection apparatus in FIG. 1.

As stated above, a watermark-embedded signal is transformed into a spatial domain by the FS transformer 150 and then recorded on a storage medium and the like by the image recorder 160, such recording operations of which are described with reference to FIG. 8.

The image recordation part 160 determines whether the watermark-embedded signal is a 24-bit image or not (Step S400). If the watermark-embedded signal is a 24-bit image, the previous IQ components left after having extracted the Y component from the YIQ components are added to the Y component (Step S410). Following the addition, a signal of the YIQ format is again converted into the RGB signal by using Formula 4 as follows (Step S420).

[Formula 4]

$$\begin{bmatrix} R \\ G \\ B \end{bmatrix} = \begin{bmatrix} 1.0 & 0.956 & 0.621 \\ 1.0 & -0.272 & -0.647 \\ 1.0 & -1.106 & 1.703 \end{bmatrix} \begin{bmatrix} Y \\ I \\ Q \end{bmatrix}$$

A signal converted as above is stored in a storage medium in a watermarked image (Step S430).

However, if the watermarked signal is not a 24-bit image in the step S400, the step 430 directly proceeds for storage since the watermarked signal is a image signal inputted from the preceding image conversion part 110 without a separate conversion step so that the above conversion is unnecessary. Further, even in case that a watermark is embedded in every channel process by the processing of the RGB format instead of converting an inputted image into the YIQ format, the step S430 directly proceeds for storage.

The watermark embedding apparatus 100 as stated above, arranges a watermark in the two-dimensional space for embeddings and embeds a watermark in the frequency domain, bringing out an effect that a watermark does not change even when taking variations as to an image such as rotations, cuttings, or the like with respect to a watermark-embedded image.

Further, the watermark detection apparatus 200 for detecting a watermark from the watermark-embedded image signal as above is described with reference to FIG. 1, and FIGS. 9 to 14.

A watermarked image can flow into a pirate or an illegal user via various ways, be pirated, and be modified. However, in case that a watermark is spatially arranged and embedded in the frequency domain by the watermark embedding apparatus 100 according to the present invention, the watermark embedded in an image has characteristics robust enough to maintain its shape even when the image undergoes variations due to image rotations, cuttings, or the like.

Descriptions are made on a apparatus and method for detecting a watermark embedded by such a manner.

If an image in which a watermark is embedded and recorded is inputted to the watermark detection apparatus 200, the image is first converted into a signal of a certain form through the image conversion part 210. The structure and operations of the image conversion part 210 in the watermark detection apparatus 200 is the same as those of the image conversion part 110 in the watermark embedding apparatus 100. That is, if an inputted image is a 24-bit image, the inputted image is converted into the YIQ format from the RGB format, only the Y component is extracted and outputted to detect a watermark. If not a 24-bit image, the inputted image is outputted without the conversion. Further, if the inputted image is in 24 bits, the RGB signal form can be outputted as it is.

An image signal outputted from the image conversion part 210 is inputted into the pre-processing part 220. The pre-processor 220 is for emphasizing the characteristics of a watermark included in the image signal, and carries out a high-pass filtering, sharpen filtering, or high-boost filtering process. Such filters employed in the pre-processor 220 are illustrated for examples in FIG. 9 and FIG. 10.

FIG. 9 is a view for showing examples of various spatial filters performing a role of boosting high-frequency components of an image signal, FIG. 9A, FIG. 9B, and FIG. 9C show mask forms for a high boost filter, a Laplacian filter, and Difference-of-Gaussian (DoG) filter, respectively.

The high boost filter in FIG. 9A serves detecting a watermark, and plays a role of boosting a watermark signal. That is, it plays a role of reducing an image component energy and increasing a watermark signal energy. Further, the DoG filter of FIG. 9C is based on Formula 5 as follows.

[Formula 5]

$$DoG(x, y) = \frac{e^{-\frac{(x^2+y^2)}{2\sigma_1^2}}}{2\pi\sigma_1^2} - \frac{e^{-\frac{(x^2+y^2)}{2\sigma_2^2}}}{2\pi\sigma_2^2}$$

In addition to the filters in FIG. 9, a filter as shown in FIG. 10 may be used for reducing an image component energy and intensifying a watermark component energy.

The pre-processor 220 as stated above is for intensifying a watermark component from an image signal, for which any one of the filters shown in FIG. 9 and FIG. 10 may be used for processing.

FIG. 11 is an exemplary view for showing results processed by filters of FIG. 9. FIG. 11A is a view for showing an example of a watermarked image before filtering, and FIGS. 11B to 11D respectively show the processed results by a high boost filter, Laplacian filter, and DoG filter.

A signal passing through the pre-processor 220 is inputted to the second SF transformer 230. The operation flows in the second SF transformer 230 is described with reference to FIG. 12. The second SF transformer 230 is for extracting an embedded watermark, which basically has the same transform process as one of the first SF transformer 120 in the watermark embedding apparatus 100 (Step S200). That is, the 2DFFT transform separates a magnitude component and a phase component, the magnitude component is extracted, and then the magnitude component is FFT-shifted.

After the FFT shift, a watermark-embedded regions are extracted in one dimension (Step S234). Since a watermark-embedded position does not change even when image transforms such as rotations, enlargements/reductions, cuttings, and so on are applied, the above processing can be carried out. The watermark-embedded regions may vary in sizes thereof. For example, in case of arranging watermarks in a concentric shape, one can be identical to a real watermark size, but inner and outer watermarks arranged about the watermark are extended in lengths thereof and formed through manipulations such as sampling and the like. Accordingly, the watermarks so changed in sizes are resized to original sizes (Step S238).

In the meantime, the watermark generator 240 of the watermark detection apparatus 200 is the same in a basic structure as the watermark generator 130 of the watermark embedding apparatus 100, but has not the watermark configurer. That is, the watermark generator 240 generates watermarks cast in one dimension as to respective pseudo-noise codes generated by a user key and an inherent key.

The correlation calculator 250, as stated above, calculates a correlation Corr between a watermark component of an image signal processed by the second SF transformer 230 and a watermark signal generated from the watermark generator 240 by using Formula 6 as below.

$$Corr = IFFT(FFT(W_{EXT}) \times conj(FFT(W_m)))$$ [Formula 6]

Here, $W_{EXT}$ denotes a watermarked embedded in an image signal extracted by the second SF transformer 230, and $W_m$ respective watermarks generated by using a user key and an inherent key by the watermark generator 240. IFFT denotes a one-dimensional inverse fast Fourier transform, FFT a one-dimensional fast Fourier Transform, and conj a complex conjugate.

The correlation calculations using the above Formula 6 are carried out by multiplying data obtained through the two-dimensional fast Fourier transform with respect to a watermarked image $W_{EXT}$ with data obtained through the two-dimensional fast Fourier transform with respect to a watermark $W_m$ generated by a user key or an inherent key from the watermark generation part 230, and then the inverse fast Fourier transform is applied to the multiplication to be converted into a spatial domain. As above, the transform into a frequency domain and the calculations based on the multiplication reduce the number of calculations compared to taking convolution with an image watermarked in the spatial domain and a watermark, enabling faster data processing.

Figure 13:
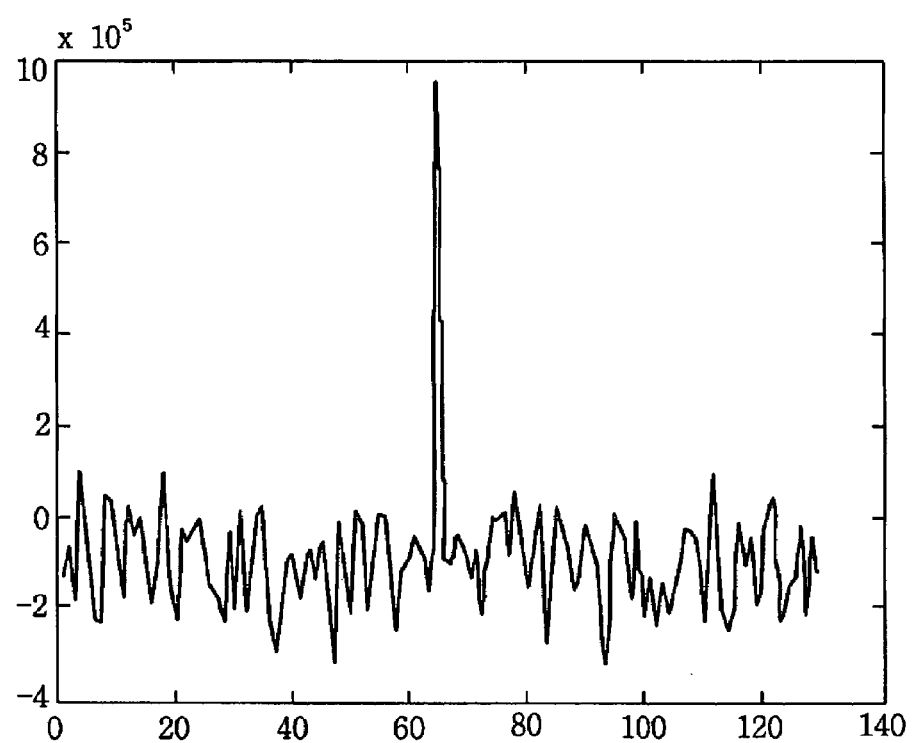
FIG. 13 is a view for showing an example of a peak detection employed for a watermark detection.

FIG. 13 is a view for showing a floated correlation calculated based on Formula 6 as to a presumptive case that a watermark is embedded. A correlation obtained by Formula 6 is not a certain value, but plural values in a one-dimensional sequence form, so such plural values are compared to enable a maximum peak value and its position to be obtained through a process as follows.

Figure 14:
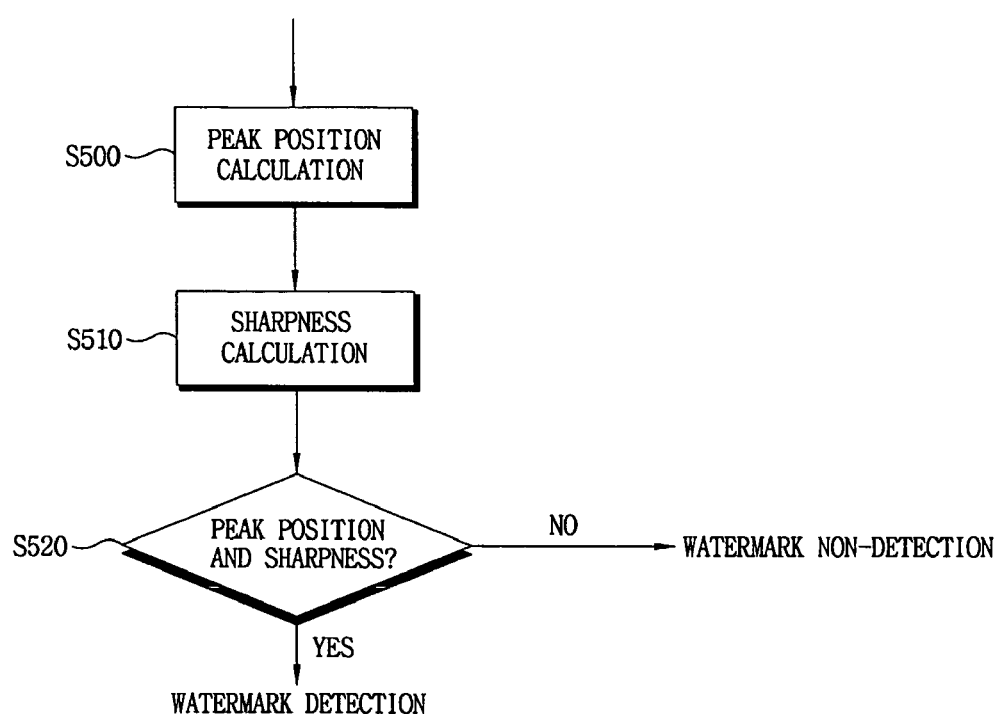
FIG. 14 is a flow chart for showing operations of a watermark detector in FIG. 1.

The watermark detector 260 checks, like a watermark is generated through an inherent key and a user key in the watermark generator 230 if peaks occur as shown in FIG. 14, whether these two key values exist and the peaks occur at the same position (Step S500). A sharpness degree is calculated based on Formula 7 if the two peak positions are the same (Step S510). The calculation of the sharpness degree, through a fourth moment (Kurtosis) K, checks whether the value of K is more than a certain threshold value (Step S520), and it is determined that a watermark is detected when the two conditions are all satisfied.

[Formula 7]

$$K(x_1, \ldots, x_N) = \left\{ \frac{1}{N} \sum_{j=1}^{N} \left[ \frac{X_j - \overline{X}}{\sigma} \right]^4 \right\} - 3$$

Here, $$x_1, \ldots, x_N$$

denotes a result value of a correlation between two watermarks $W_m$ and $W_{EXT}$, $\overline{X}$ an average of $$x_1, \ldots, x_N,$$

and σ a standard deviation.

The determination as to whether a value of K is more than a certain threshold value in the above procedure is to determine whether a watermark is embedded through a comparison between a peak value and a set threshold value since a peak appears high at an calculated value in case that the watermark is embedded. In here, the threshold value is shown as a value allocated in a certain manner by experiments. However, when the condition is not satisfied in the Step S520, it is determined that a watermark is not detected.

INDUSTRIAL APPLICABILITY

As described above, the present invention relates to a method and apparatus for embedding and detecting a watermark, which uses a watermark formed in a radial or circular format in the two-dimensional form upon embeddings and changes its configuration for the embedding into an image signal in the frequency domain, enhancing the robustness of a watermark against signal variations. Further, upon the detection of the watermark, a watermark embedded in the radial or circular format in the two-dimensional form as above can be effectively detected, enhancing the accuracy and promptness for watermark detections.

In particular, the present invention greatly reduces the complexity of an entire system compared to a method using the existing log-polar mapping and removes data losses which can occur in the step of the log-polar mapping and the inverse log-polar mapping, to thereby facilitate the watermark detections as well as remarkably reduce image losses when embedding a watermark.

Although the preferred embodiment of the present invention has been described in particular, it will be understood by those skilled in the art that the present invention should not be limited to the described preferred embodiment, but various changes and modifications can be made within the spirit and scope of the present invention as defined by the appended claims.

What is claimed is:

1. A digital watermark embedding method for embedding a digital watermark in an image signal, comprising steps of:
   using a user key and an inherent key to generate respective pseudo-noise codes;

adding the pseudo-noise code generated based on the user key and the pseudo-noise code generated based on the inherent key;

generating a digital watermark at least in part by arranging in two-dimensional form a watermark formed by the added pseudo-noise codes, and rotating the watermark from a stream format 360° about a first value of a watermark of a predetermined length to be in a radial format;

converting the image signal from a spatial domain to a frequency domain; and adding a magnitude component of the image signal converted into the frequency domain and the generated watermark.

2. The method as claimed in claim 1, wherein the watermark arrangement step arranges the watermark of a stream format into plural concentric circles about a center portion of a block constructing the image signal.

3. The method as claimed in claim 2, wherein the watermark arranged in the concentric circles is arranged with enlargements/reductions by sampling a corresponding stream with reference to a predetermined radius.

4. The method as claimed in claim 1, wherein the frequency domain conversion step includes steps of:

applying a two-dimensional Fourier transform to the image signal for the conversion from the spatial domain to the frequency domain;

separating a signal converted to the frequency domain into a magnitude component and a phase component; and applying a Fourier transform shift to the separated magnitude component.

5. The method as claimed in claim 4, further comprising a step of converting from the frequency domain to the spatial domain the signal the watermark and the image signal are added, and the conversion step including steps of:

applying the Fourier transform shift to the watermark and the image signal;

applying an inverse two-dimensional Fourier transform to the shifted signal for a conversion from the frequency domain to the spatial domain; and adjusting a value of the image signal to prevent an overflow of the converted image signal.

6. The method as claimed in claim 5, wherein the image signal is a 24-bit color signal, and, before adding the digital watermark and the image signal, a step of converting the image signal inputted in an RGB format into an YIQ format (Y: Luminance, I: In-Phase, and Q: Quadrature) and a step of extracting only the Y component from the components of the converted YIQ format are further comprised, and the Y component is added to the digital watermark.

7. The method as claimed in claim 6, further comprising a step of storing an image signal the image signal and the digital watermark are added, and the storage step including steps of:

adding the IQ components and the added image signal;
converting the added signal into the RGB format; and
storing the converted signal in a storage medium as a record signal.

8. The method as claimed in claim 5, wherein the image signal is the 24-bit color signal, and the image signal inputted in the RGB format is added to the digital watermark by each of R, G, and B channels.

9. The method as claimed in claim 5, wherein the image signal adjustment step sets a value of the image signal to a boundary value of a range in case that the image signal has a value beyond the corresponding range.

10. A digital watermark detection method for detecting a digital watermark embedded in an image signal, comprising steps of:

strengthening a component of the digital watermark embedded in the image signal;

converting the digital watermark-strengthened image signal from a spatial domain to a frequency domain and extracting the digital watermark included in the image signal;

generating a digital watermark for comparison with the extracted digital watermark by generating respective pseudo-noise codes and forming a digital watermark using a user key and an inherent key, and rotating the watermark from a stream format 360° about a first value of a watermark of a predetermined length to be in a radial format;

calculating correlation between the generated digital watermark and the digital watermark extracted from the image signal; and detecting the watermark embedded in the image signal based on the correlation.

11. The method as claimed in claim 10, wherein the image signal is a 24-bit color signal, before carrying out the step of strengthening the component of the digital watermark embedded in the image signal, further comprised are steps of:

converting the image signal inputted in an RGB format into a YIQ format; and extracting only the Y component from the components of the converted YIQ format, and the step of strengthening the component of the digital watermark is to strengthen a component of the digital watermark embedded in the Y component.

12. The method as claimed in claim 11, wherein the step of strengthening the component of the digital watermark includes a step of filtering a high frequency component of the image signal.

13. The method as claimed in claim 12, wherein the high frequency filtering step is carried out through a high boost filter, a Laplacian filter, or a Difference of Gaussian (DoG) filter.

14. The method as claimed in claim 11, wherein the step of strengthening the component of the digital watermark includes a step of applying a masking in order to reduce an image component energy in the image signal and increase a watermark component energy.

15. The method as claimed in claim 11, wherein the digital watermark extraction step comprises steps of:

converting the digital watermark-strengthened image signal from the spatial domain to the frequency domain;

extracting from the converted image signal in one dimension a region in which the digital watermark is embedded; and adjusting a length of the extracted one-dimensional digital watermark to a predetermined length.

16. The method as claimed in claim 15, wherein correlation calculations are carried out with a Formula as below:

$$\text{Corr} = \text{IFFT}(\text{FFT}(W_{EXT}) \times \text{conj}(FFT(W_m)))$$

here, $W_{EXT}$ denotes a digital watermark extracted from an image signal, and $W_m$ respective watermarks generated by using a user key and an inherent key, IFFT an inverse fast Fourier transform, FFT a fast Fourier Transform, and conj a complex conjugate.

17. The method as claimed in claim 16, wherein the watermark detection step includes steps of:

calculating a peak position from the calculated correlation;

calculating a peak sharpness; and determining whether the digital watermark is included in the image signal based on the peak position and the sharpness.

18. The method as claimed in claim 10, wherein the image signal is the 24-bit color signal, a step of separating the image signal inputted in the RGB format into each of R, G, and B channels is further comprised, and the step of strengthening the component of the digital watermark is to strengthen the components of the digital watermark embedded in signals separated channel by channel.

19. The method as claimed in claim 18, wherein the digital watermark extraction step comprises steps of:

converting the digital watermark-strengthened image signal from the spatial domain to the frequency domain;

extracting from the converted image signal in one dimension a region in which the digital watermark is embedded; and adjusting a length of the extracted one-dimensional digital watermark to a predetermined length.

20. A digital watermark embedding apparatus for embedding a watermark in an image signal, comprising:

a first conversion means for converting the image signal from a spatial domain to a frequency domain;

a watermark generation means for generating a watermark;

a first addition means for adding the watermark to the frequency-converted image signal;

a second conversion means for converting the watermark-added image signal generated by the first addition means from the frequency domain to the spatial domain; and an image record means for recording the watermark-embedded image signal converted into the spatial domain, the watermark generation means comprising:

a) a first pseudo-noise code generation means for generating a pseudo-noise code using a user key;

b) a second pseudo-noise code generation means for generating a pseudo-noise code using an inherent key;

c) a second addition means for adding pseudo-noise codes generated from the first pseudo-noise generation means and the second pseudo-noise generation means; and d) a configuration means for configuring in a two-dimensional arrangement the watermark formed by the addition through the second addition means, the configuration means rotating the watermark from a stream format 360° about a first value of a watermark of a predetermined length to be in a radial format.

21. The apparatus as claimed in claim 20, wherein the watermark configuration means arranges the watermark of a stream format into plural concentric circles about a center portion of a block constructing the image signal.

22. The apparatus as claimed in claim 21, wherein the watermark configuration means enlarges and reduces the watermark arranged in the form of the concentric circles by sampling a corresponding stream with reference to a predetermined radius to be arranged in a form of plural concentric circles.

23. The apparatus as claimed in claim 20, wherein the first addition means divides the image signal into a watermark size, and adds the divided image signal and the watermark channel by channel.

24. The apparatus as claimed in claim 20, further comprising an image conversion means for converting a format of the image signal before adding the image signal and the watermark, the image conversion means including:

a first determination means for reading header information of the image signal and determining whether the image signal is a 24-bit color image;

a first conversion means for converting the image signal of RGB format into a YIQ format if the image signal is the 24-bit color image signal; and an extraction means for extracting only a Y component from the image signal converted to the YIQ format, the image conversion means outputs the image signal to the first addition means without the conversion if the image signal is not the 24-bit color image.

25. The apparatus as claimed in claim 24, wherein the image record means comprises:

a first determination means for reading out the header information of the image signal and determine whether the image is a 24-bit color image;

an addition means for adding the watermark-embedded image signal of the Y component and the IQ components separated by the extraction means if the image signal is the 24-bit image signal; and a second conversion means for converting the added signal of the YIQ format into the RGB format, the image record means storing the processed image signal in a record medium.

26. A digital watermark detection apparatus for detecting a watermark embedded in an image signal, comprising:

a pre-processing means for strengthening a component of a watermark embedded in the retrieved image signal;

an extraction means for converting the digital watermark-strengthened image signal from a spatial domain to a frequency domain and extracting the digital watermark embedded in the image signal;

a digital watermark generation means for generating respective digital watermarks based on a user key and an inherent key for a comparison with the extracted digital watermark, the watermark generation means including:

a) a first pseudo-noise code generation means for generating a pseudo-noise code based on the user key;

b) a second pseudo-noise code generation means for generating a pseudo-noise code based on the inherent key; and c) configuration means for arranging and configuring in a two-dimensional form a watermark comprising the pseudo-noise codes generated from the first pseudo-noise code generation means and the second pseudo-noise code generation means, the configuration means rotating the watermark from a stream format 360° about a first value of a watermark of a predetermined length to be in a radial format;

a correlation calculation means for calculating a correlation between the generated digital watermark and the extracted digital watermark from the image signal; and a watermark detection means for detecting a watermark embedded in the image signal according to the calculated correlation.

27. The apparatus as claimed in claim 26, wherein the image signal is the 24-bit color image, an image signal conversion means for converting a format of the image signal is further included before carried out by the preprocessor for strengthening a component of the digital watermark embedded in the image signal, and the image signal conversion means includes:

- a conversion means for converting the image signal inputted in the RGB format into the YIQ format; and
- an extraction means for extracting only the Y component of the components of the converted YIQ format.

28. The apparatus as claimed in claim 27, wherein the extraction means includes:

- a means for converting from the spatial domain to the frequency domain the image signal the digital watermark component is strengthened;
- a means for extracting in one dimension a region in which the digital watermark is embedded from the converted image signal; and
- a means for adjusting a length of the extracted one-dimensional digital watermark to a predetermined length.

29. The apparatus as claimed in claim 28, wherein the correlation calculations are carried out based on a Formula as blow:

$$\text{Corr}=\text{IFFT}(\text{FFT}(W_{EXT})\times\text{conj}(\text{FFT}(W_m)))$$

here, $W_{EXT}$ denotes a watermark extracted from an image signal, and $W_m$ respective watermarks generated by using a user key and an inherent key, IFFT an inverse fast Fourier transform, FFT a fast Fourier Transform, and conj a complex conjugate.

30. The apparatus as claimed in claim 29, wherein the watermark detection means includes:

- a means for calculating a peak position and a peak sharpness from the correlation; and
- a means for determining whether a watermark is included in the image signal based on the peak position and the sharpness.

31. The apparatus as claimed in claim 26, wherein the image signal is the 24-bit color signal, and the R, G, and B channels of the image signal inputted in the RGB format are inputted to the pre-processing means channel by channel.

32. The apparatus as claimed in claim 31, wherein the extraction means comprises:

- a means for converting from the spatial domain to the frequency domain the image signal the digital watermark component is strengthened;
- a means for extracting in one dimension a region in which the digital watermark is embedded from the converted image signal; and
- a means for adjusting a length of the extracted one-dimensional digital watermark to a predetermined length.

33. The apparatus as claimed in claim 26, wherein the pre-processing means filters a high frequency component of the image signal.

34. The apparatus as claimed in claim 33, wherein the high frequency filtering is carried out by a high boost filter, a Laplacian filter, or a Difference of Gaussian (DoG) filter.

35. The apparatus as claimed in claim 26, wherein the pre-processing means carries out a masking in order to reduce an image component energy and increase a watermark component energy in the image signal.

* * * * *